Figure 1:
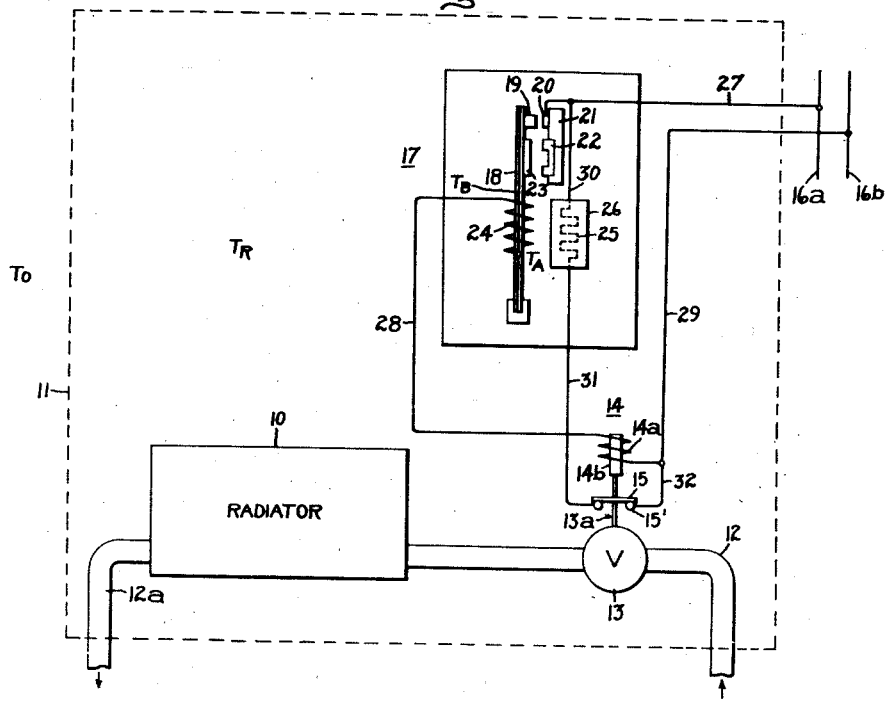

Sept. 8, 1942.  M. E. FIENE  2,295,340
THERMOSTAT
Filed Dec. 20, 1940

% CYCLE TIME CONTACTS CLOSED.
% MAXIMUM OUTPUT OF TEMPERATURE
CHANGING APPARATUS PER CYCLE.

Inventor:
Marcus E. Fiene,
by Harry E. Dunham
His Attorney.

Patented Sept. 8, 1942

2,295,340

UNITED STATES PATENT OFFICE 2,295,340

THERMOSTAT

Marcus E. Fiene, Caldwell, N. J., assignor to General Electric Company, a corporation of New York Application December 20, 1940, Serial No. 371,021

5 Claims. (Cl. 236—68)

My invention relates to temperature regulating apparatus and more particularly to temperature regulating apparatus for controlling a building heating system to maintain a desired temperature within the building or a portion thereof.

In thermostatically controlled heating systems it is desirable to have a modulated control, that is, one in which the heat output is varied in a continuous manner to balance the heat loss and thereby maintain a constant temperature condition. It frequently happens, however that the output of a heating system cannot be satisfactorily varied in a continuous manner so that it is necessary to use a discontinuous control known as the "on"-"off" type of control system. However, if the cycle time is made of sufficiently short duration in an "on"-"off" type of control system a modulated control may be approached. This may be accomplished by providing an auxiliary heater for locally heating the thermostat which is energized when the thermostat is in the "on" position and deenergized when the thermostat is in the "off" position. If the thermostat is calibrated to operate between control positions at temperatures above the temperature to be maintained in the space but within the range of temperatures to which the heater can heat the thermostat, the thermostat will continuously cycle between the "on" and "off" positions. The percentage of cycle time that the thermostat is in the "on" position and consequently the percentage of maximum output of the heating apparatus is a function of the ambient or space temperature and any fluctuation in the space temperature will cause this percentage to vary in a direction to correct for the temperature fluctuation.

One difficulty with this control system is that it inherently has a drooping characteristic, that is, the temperature maintained by the thermostat continuously decreases as the load on the heating apparatus increases. The reason for this is the fact that a lower ambient temperature is required to cause the thermostat to remain in the "on" position, a greater percentage of time, the rate of heating and cooling of the thermostatic element being a function of the ambient temperature. The range of temperatures maintained by the thermostat between no load and full load on the heating apparatus is known as the sub-calibration of the thermostat. The fluctuation in space temperature due to sub-calibration of the thermostat is undesirable and often necessitates a resetting of the thermostat in order to keep the space temperature within permissible limits of variation.

Furthermore, it is sometimes desirable to have the controlled temperature vary in a direction opposite to that caused by the sub-calibration effect of the thermostat, that is, to cause the controlled temperature to rise with an increased load on the heating system rather than fall. The reason for this is the fact that as the outside temperature decreases and the load on the heating system increases a higher room temperature is necessary to produce a feeling of comfort to the occupant because of changes in humidity conditions, the amount of radiation to the cold building wall and also because of a lowering of the floor level temperature due to stratification of the heated air.

It is an object of my invention to provide a new and improved temperature regulating system.

A further object of my invention is to provide a thermostatic control system in which sub-calibration of the thermostat is avoided.

A still further object of my invention is to provide a thermostat of the continuously oscillating type for controlling temperature changing apparatus having means for varying the temperature maintained by the thermostat in accordance with the percentage of time the temperature changing apparatus is in operation.

A still further object of my invention is to provide a thermostat of the continuously oscillating type for controlling temperature changing apparatus which will maintain a constant temperature irrespective of the percentage of time the temperature changing apparatus is in operation.

Another object of my invention is to provide a thermostat of the continuously oscillating type for controlling temperature changing apparatus having means for automatically increasing the temperature setting of the thermostat as the percentage of time the temperature changing apparatus is in operation increases.

Further objects and advantages of my invention will become apparent as the following description proceeds and the features of novelty which characterize my invention will be pointed out with particularity in the claims annexed to and forming a part of this specification.

According to my invention temperature changing apparatus is controlled by an "on"-"off" type of operator and the position of the operator is governed by a thermostat located in a space the temperature of which is to be controlled. A pair of auxiliary temperature changing means are provided to locally affect the thermal responsive element of the thermostat and are so arranged that one of the auxiliary temperature changing means is rendered effective when the thermostat is in the "on" position and the other is rendered effective when the thermostat is in the "off" position. The auxiliary temperature changing means that is effective when the thermostat is in the "on" position has a relatively low thermal time constant so that it acts to cause cyclic operation of the thermostat while the other auxiliary temperature changing means has a relatively large thermal time constant so that its heating effect upon the thermostat is substantially uniform rather than cyclic for any given cycle of operation. The second auxiliary temperature changing means acts to create a false ambient temperature around the thermostat and thereby, in effect, change its setting. The average heating effect of both auxiliary temperature changing means is dependent upon the percentage of time each is energized and this, in turn, is dependent upon the percentage of time the heating apparatus is in operation. By properly proportioning the average heating effect of the two auxiliary temperature changing devices sub-calibration can be reduced, eliminated or the reverse effect of sub-calibration may be obtained, that is, the thermostat may be made to maintain a temperature in the space to be heated which increases with an increase in load on the system.

Figure 2:
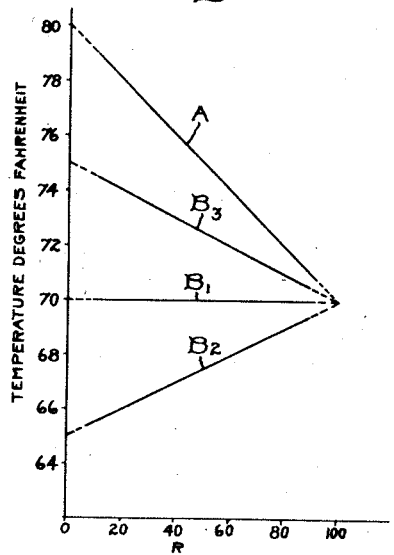

A more detailed understanding of the present invention may be secured from the following description taken in connection with the accompanying drawing in which Fig. 1 shows a heating system controlled by a thermostat embodying my invention and Fig. 2 shows a series of curves which are useful in explaining the operation of my invention.

Referring to Fig. 1 of the drawing, I have shown for purposes of illustrating my invention, a radiator 10 for supplying heat to a space, indicated by the dotted lines 11, the temperature of which is to be controlled. Heating fluid flows into the radiator 10 from a source not shown through a conduit 12 and leaves by a conduit 12a, the admission of heating fluid to the radiator being controlled by means of a valve 13. A valve operating solenoid 14, having an operating winding 14a and an armature 14b, is provided for controlling the position of an operating member 13a of the valve 13. The operating member 13a, in addition to controlling the position of valve 13, also controls a bridging member 15 cooperating with a pair of contacts 15', the purpose of which will be described below. The solenoid coil 14a is connected to the electric supply conductors 16a and 16b by a circuit including the contacts of a thermostat 17 located within the space 11.

The thermostat 17 comprises a bimetallic temperature responsive element 18 which is fixed at one end and carries at its free end a movable contact 19. The movable contact 19 cooperates with a stationary contact 20 attached to a fixed support 21. The support 21 also carries a permanent magnet 22 which, in cooperating with an armature 23 attached to the bimetallic member 18, acts to give the thermostat a temperature differential of operation in a manner well known in the art.

The thermostat is provided with a pair of electric heaters 24 and 25 for locally influencing and modifying the action of the bimetallic element 18. The heater 24 comprises a coil of electrically insulated resistance wire wound in intimate thermal contact with the bimetallic element 18 so that it has a relatively low thermal time constant, that is, it increases the temperature of the bimetallic element 18 rapidly upon the passage of current therethrough. The heater 25 comprises a coil or section of resistance wire and is made to have a relatively high thermal time constant by surrounding the resistance wire with a mass of material 26 having a high thermal storage capacity and preferably a high thermal conductivity, such as brass.

Electric heaters 24 and 25 are arranged in control circuits so that they are energized alternately, the heater 24 being energized when the thermostat contacts are closed and the heater 25 being energized when the thermostat contacts are open. The energizing circuit for the heater 24 may be traced as follows: supply conductor 16a, conductor 27, thermostat contacts 19 and 20, bimetallic blade 18, heater 24, conductor 28, operating coil 14a, conductor 29 and supply conductor 16b. The energizing circuit of the heater 25 may also be traced as follows: the supply conductor 16a, conductor 27, conductor 30, heater 25, conductor 31, contacts 15' and bridging member 15, conductor 32, conductor 29 and supply conductor 16b. It will thus be apparent that when the thermostat contacts 19 and 20 are closed, both heater 24 and operating coil 14a will be energized and the valve 13 will be opened by the solenoid 14 to admit heating fluid to radiator 10. The movement of the valve to the open position also moves bridging member 15 to open contacts 15' and deenergize heater 25. When the contacts 19 and 20 open, the heater 24 and the operating coil 14a are deenergized and the valve 13 closes to stop the flow of heating fluid to the radiator 10. At the same time contacts 15' are closed by bridging member 15 to energize the heater 25.

It is believed that the understanding of the operation of my invention will be clarified by taking a concrete example for the purpose of illustration.

In the ensuing discussion the following terminology will be used.

$T_O$ = temperature outside space 11.
$T_R$ = temperature in space 11.
$T_A$ = ambient temperature of bimetallic element 18.
$T_B$ = temperature of bimetallic element 18.
$t_m$ = temperature thermostat contacts close.
$t_b$ = temperature thermostat contacts open.
$\theta_m'$ = maximum heating effect of heater 24.
$\theta_m''$ = maximum heating effect of heater 25.
$\theta''$ = heating effect of heater 25.

$$R = \begin{cases} \text{percentage of thermostat cycle time contacts remain closed.} \\ \text{percentage maximum output of radiator 10 per cycle.} \end{cases}$$

Let it be assumed that the setting of the thermostat contacts is such that $t_m = 79°$ F. and $t_b = 81°$ F. so that the thermostat has a 2° F. mechanical differential of operation. Also, let it be assumed that heater 24 has a capacity, $\theta_m'$, to heat the bimetal 18 10° F. when continuously energized.

Under normal conditions of operation the thermostat continuously cycles so that the contacts 19 and 20 remain in the closed or "on" position for a period of time and then suddenly snap open and remain in the "off" position for another period of time after which they snap closed and the cycle is repeated. Since the radiator 10 is supplied with heating fluid only while the contacts are in the "on" position, it is evident that the percentage of thermostat cycle time that the contacts are in the "on" position, R, is also equal to the percentage of maximum output of the temperature changing apparatus or radiator 10 per cycle. By controlling the percentage of time the radiator is supplied with heating fluid, the thermostat 17 acts to control the average heat output of the radiator and consequently the temperature of space 11.

In Fig. 2 of the drawing the curve A shows the relationship between R and $T_A$. It will be noted that as $T_A$ varies from 79° to 71° F., R increases from 10% to 90%. The reason that R increases as $T_A$ decreases is that as the bimetal ambient temperature, $T_A$, decreases, a longer period of time is required to raise the bimetal temperature $T_B$ from 79° F. to 81° F. because of increased heat loss to the ambient medium. This increased heat loss also decreases the time required for the bimetal temperature to fall from 81° to 79° F. Hence the time the contacts remain closed becomes a greater percentage of the thermostat cycle time as $T_A$ increases.

The thermostat contacts remain open when $T_A$ increases above 79° F. since $T_B$ cannot fall to the opening temperature $t_m$ which is 79° F. Also the thermostat contacts will remain closed if $T_A$ falls below 71° F. since then the heater 24, under the conditions assumed, can only raise $T_B$ 10° F. above $T_A$ and therefore the bimetal cannot be heated to the opening temperature $t_b$ which is 81° F. However, for normal variations of $T_A$ between 71 and 79° F., the thermostat will continuously cycle and there is a definite relation between $T_A$ and R.

Now, if the heater 25 were omitted from the thermostat, $T_R$ would equal $T_A$ and it is evident that the temperature maintained by the thermostat in space 11 would fall from 79° F. to 71° F. as the load on the radiator increased from 10% to 90% of maximum output such as would occur when $T_O$ fell due to a change from mild to cold weather. This drop in temperature maintained in space 11 with increased load (R) is known as the thermostat sub-calibration.

For the purpose of eliminating or modifying the sub-calibration effect, the heater 25 acts to create a false ambient so that a difference exists between $T_R$ and $T_A$. Thus $T_A$ will always equal $T_R$ plus the heating effect $\theta''$ of the heater 25. For the conditions assumed above, the relation between $T_A$ and R is fixed within the range of oscillating operation of the thermostat. Hence it is evident that by varying $\theta''$ a given value of R can be made to correspond to any desired value of $T_R$.

According to my invention the heater 25 is energized only when the thermostat contacts are in the "off" position so that as R increases the average heating effect $\theta''$ of heater 25 decreases and vice versa. Thus as R varies, the difference between $T_A$ and $T_R$ also varies with the result that a new relation between $T_R$ and R is obtained which is different from the relation between $T_A$ and R. Since heater 25 has a relatively large thermal time constant, it does not undergo an appreciable temperature change during one cycle of the thermostat operation and hence there is little or no tendency for it to nullify the cyclic heating and cooling action of the bimetal 18 caused by the action of heater 24.

If $\theta_m''$ is made equal to $\theta'$ which in the present case is 10° F., $T_R$ will remain constant at 70° F., under equilibrium conditions, for any value of R between maximum and minimum limits whereby the sub-calibration effect of the thermostat is eliminated. This constant value of $T_R$ is indicated by the curve $B_1$ in Fig. 2 of the drawing and can be demonstrated by reference to the following Table I of calculations.

*Table I*

| R | $T_A$ | $\theta''$ | $T_R$ |
|---|---|---|---|
| Per cent | °F. | °F. | °F. |
| 30 | 77 | 7 | 70 |
| 50 | 75 | 5 | 70 |
| 70 | 73 | 3 | 70 |

In calculating the values shown in the above and the following tables, the relationship between R and $T_A$ may be determined from the curve A and the following equations may be used to determine the values of $\theta''$ and $T_R$ $$\theta = \frac{\theta_m''(100-R)}{100}$$

$$T_R = T_A - \theta''$$

If $\theta_m''$ is made greater than $\theta'_m$, $T_R$ can be made to actually increase with an increase in R whereby the reverse effect of sub-calibration is obtained. The following Table II shows how $T_R$ varies with R in the case where $\theta_m'' = 15°$ F. and this relationship between $T_R$ and R is indicated by the curve $B_2$.

*Table II*

| R | $T_A$ | $\theta''$ | $T_R$ |
|---|---|---|---|
| Per cent | °F. | °F. | °F. |
| 30 | 77 | 10.5 | 66.5 |
| 50 | 75 | 7.5 | 67.5 |
| 70 | 73 | 4.5 | 68.5 |

If $\theta_m''$ is made less than $\theta_m'$, $T_R$ can be made to decrease with an increase in R. However, the variation of $T_R$ with R is less than the variation of $T_A$ with R whereby, in effect, reduced sub-calibration is obtained. The following Table III shows how $T_R$ varies with R in the case where $\theta_m'' = 5°$ F. and this relationship between $T_R$ and R is shown by the curve $B_3$.

*Table III*

| R | $T_A$ | $\theta''$ | $T_R$ |
|---|---|---|---|
| Per cent | °F. | °F. | °F. |
| 30 | 77 | 3.5 | 73.5 |
| 50 | 75 | 2.5 | 72.5 |
| 70 | 73 | 1.5 | 71.5 |

In the tables set forth above, only three points are calculated which are deemed sufficient to show the direction of change of $T_R$ with variations in R for different values of $\theta_m''$.

For the purpose of explaining the operation of my device, a specific case will be taken where it is desired to maintain the space temperature constant at 70° F. Let it be assumed that both $\theta_m'$ and $\theta_m''$ are equal and are 10° F. so that the calculations listed in Table I will be applicable. Also, let it be assumed that the temperature regulating system is operating under equilibrium conditions so that R equals 50% and the heat supplied by radiator 10 just balances the heat losses from space 11 for a space temperature $T_R$ of 70° F. From Table I it will be observed that $\theta''$ is 5° F. and $T_A$ is 75° F.

Now let it be assumed that $T_O$ falls to a point where the radiator must be supplied with heating fluid 70% of the time to maintain the space temperature $T_R$ at 70° F. Due to the decrease in outside temperature $T_O$, $T_R$ will begin to decrease which also causes $T_A$ to decrease. The decrease in $T_A$ causes R to increase since, as pointed out before, $T_A$ and R bear a fixed relation as indicated by the curve A of Fig. 2. The increase in R causes the heater 25 to be energized a smaller percentage of time per cycle whereby $\theta''$ gradually decreases. This decrease in $\theta''$ causes $T_A$ to still further decrease thus further increasing R. The increase in R, however, increases the output of radiator 10 so that $T_R$ begins to rise and $T_A$ falls at a progressively slower rate until eventually a new equilibrium condition where $T_R$ is 70° F., $T_A$ is 73° F., $\theta''$ is 3° F. and R is 70% as shown by Table I.

Again let it be assumed that we have the equilibrium conditions selected above where R equals 50% but, instead of decreasing, $T_O$ rises to a point where the radiator 10 needs to be supplied with heating fluid only 30% of the thermostat cycle time to maintain $T_R$ at 70° F. $T_R$ then rises causing $T_A$ to increase and R to decrease. The decrease in R causes $\theta''$ to gradually increase and further increase $T_A$. Eventually, however, the decrease in R causes $T_R$ to decrease and a new equilibrium condition is reached where $T_R$ is 70° F., $T_A$ is 77° F., $\theta''$ is 7° and R is 30% as shown by Table I.

From the foregoing description of operation it is believed to be clear that the thermostat 17 will act to maintain a constant room temperature, $T_R$, for all load conditions between maximum and minimum limits in the case where the maximum heating effect $\theta_m''$ of the heater 25 is made equal to the maximum heating effect $\theta_m'$ of the heater 24.

It is also believed to be clear by reference to Tables II and III, and without further description of operation, that by varying the value of $\theta_m''$ relative to $\theta_m'$ the space temperature $T_R$ can be made to vary in any desired direction with variations in the load on the heating system. However, by way of summary, it may be stated that if $\theta_m''$ is greater than $\theta_m'$ the temperature maintained by the thermostat 17 will increase as the load on the heating system increases. On the other hand, if $\theta_m''$ is less than $\theta_m'$ the temperature maintained by the thermostat will decrease as the load on the heating system increases. The degree of change of controlled temperature with changes in load is a function of the difference between $\theta_m'$ and $\theta_m''$ and in the case where this difference is zero, the controlled temperature will remain constant. It is to be understood that the specific temperature values used in the description of my invention are for the purpose of illustration only and other temperature values may be selected as desired.

Thus my improved temperature responsive control apparatus functions automatically to give any desired controlled temperature variation with variations in load on the temperature changing apparatus whereby the need for manually changing the thermostat setting for different load conditions is obviated.

It will be understood that my temperature responsive control apparatus may be utilized to control any temperature changing means without departing from my invention in its broader aspects. Thus the electroresponsive device illustrated as a solenoid 14 might be used to actuate between "on" and "off" positions an oil burner, refrigerating apparatus or any other temperature changing apparatus.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. Apparatus for controlling the temperature of a space to be heated comprising in combination, a thermostat responsive to the temperature of said space, said thermostat having a control element movable intermittently back and forth between low and high temperature positions upon the heating and cooling of said thermostat through a predetermined range of temperatures, said temperatures being above the temperature to be maintained in said space, an electric heater having sufficient capacity when energized to raise the temperature of said thermostat through said range, means for energizing said heater when said element is in the low temperature position whereby a relatively short cycle of operation of said control element is obtained, the time said control element remains in the low temperature position being a function of the thermostat ambient temperature, a second electric heater energized when said control element is in the high temperature position and associated with said thermostat so that said thermostat ambient temperature is determined jointly by the temperature of the space to be controlled and the heating action of said second heater, and means for delivering heat to said space at a rate proportional to the percentage of time said control element remains in the low temperature position.

2. In a temperature control system, apparatus for changing the temperature of a space, a control device having an element responsive to the temperature of said space for controlling said apparatus, said device moving between high and low temperature positions corresponding to different output rates of said apparatus at spaced predetermined temperatures, the difference between said spaced temperatures constituting the temperature differential of operation of said control device, a first heating means for locally heating said temperature responsive element, said first heating means being effective only when said control device is in said low temperature position and having sufficient heating capacity to heat said temperature responsive element through a range of temperatures greater than said temperature differential of operation of said control device whereby a relatively short cycle time of said control device and said apparatus is obtained, and means for compensating for the tendency of said control device to maintain progressively lower temperatures in said space as the percentage of time of said control device remains in said low temperature position increases as a result of changes in the required average output of said apparatus, said compensating means comprising a second heating means located in heat exchange relation with said temperature responsive element so as to maintain the ambient temperature thereof above the temperature of said space, and means controlled by said device for varying the heating effect of said second heating means in accordance with the percentage of time said control device remains in said high temperature position.

3. In a temperature control system, apparatus for changing the temperature of a space, a thermostat having an element responsive to the temperature of said space for controlling the temperature changing effect of said apparatus, said thermostat moving between high and low temperature positions at spaced predetermined temperatures, the difference between said spaced temperatures constituting the temperature differential of operation of said thermostat, a first electric heater located in heat exchange relation with said temperature responsive element and connected to be energized only when said thermostat is in said low temperature position, said first heater having sufficient capacity to heat said temperature responsive element through a range of temperatures greater than said temperature differential of operation of said thermostat, a second electric heater located in heat exchange relation with said temperature responsive element and connected to be energized when said thermostat is in said high temperature position, said second heater having sufficient thermal mass so that its heating effect on said temperature responsive element does not vary appreciably during a cycle of thermostat operation, said second heater acting to raise the ambient temperature of said temperature responsive element above the temperature of said space an amount variable in accordance with the percentage of time said thermostat remains in said high temperature position.

4. In a temperature control system, apparatus for heating a space, said apparatus having "on" and "off" positions, a thermostat having an element responsive to the temperature of said space for controlling said apparatus, said thermostat moving between low and high temperature positions corresponding respectively to said "on" and "off" positions of said apparatus at spaced predetermined temperatures, the difference between said spaced predetermined temperatures constituting the temperature differential of operation of said thermostat, a first electric heater located in heat exchange relation with said temperature responsive element and connected to be energized only when said thermostat is in said low temperature position, said first heater having sufficient capacity to heat said temperature responsive element through a range of temperatures greater than said temperature differential of operation of said thermostat, a second electric heater located in heat exchange relation with said temperature responsive element and connected to be energized when said thermostat is in said high temperature position, said second heater having sufficient thermal mass so that its heating effect on said temperature responsive element does not vary appreciably during a cycle of thermostat operation, said second heater acting to raise the ambient temperature of said temperature responsive element above the temperature of said space an amount variable in accordance with the percentage of time said thermostat remains in said high temperture position.

5. In a temperature control system, apparatus for changing the temperature of a space, a control device having a temperature responsive element responsive to the temperature of said space for controlling said apparatus, said control device moving intermittently between low and high temperature positions corresponding to different output rates of said apparatus upon heating and cooling of said temperature responsive element through a predetermined range of temperatures said range of temperatures being above the temperature to be maintained in said space, a first heating means for locally heating said temperature responsive element, said first heating means being effective only when said control device is in said low temperature position and having sufficient heating capacity to raise the temperature of said temperature responsive element through said range so that said control device cycles independently of variation in space temperature due to changes in the output of said apparatus whereby a relatively short cycle time of said control device and said apparatus is obtained and means for compensating for the tendency of said control device to maintain progressively lower temperatures in said space as the percentage of time said control device remains in said low temperature position increases as a result of a change in load on said apparatus, said compensating means comprising a second heating means in heat exchange relation with said temperature responsive element so as to raise the ambient temperature thereof above the temperature of said space, and means controlled by said control device for varying the heating effect of said second heating means in accordance with the percentage of time said control device remains in said high temperature position.

MARCUS E. FIENE.